Aug. 2, 1938.   F. JACOBSON   2,125,447
FLEXIBLE CORRUGATED METAL TUBING
Filed Sept. 10, 1936
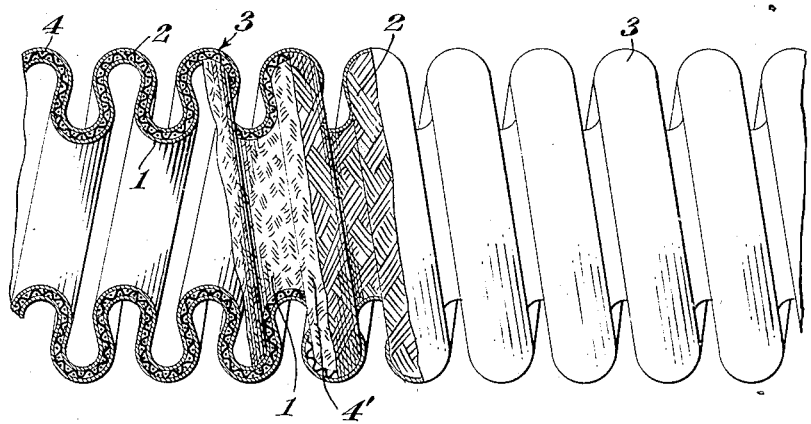
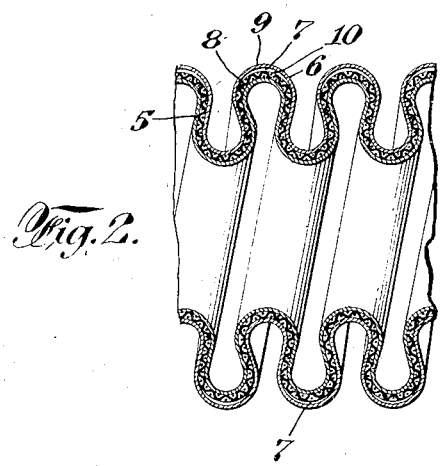
INVENTOR
Franz Jacobson
BY
Pundle, Bean & Mann
ATTORNEY Patented Aug. 2, 1938

2,125,447

UNITED STATES PATENT OFFICE 2,125,447

FLEXIBLE CORRUGATED METAL TUBING

Franz Jacobson, Brooklyn, N. Y.

Application September 10, 1936, Serial No. 100,105

4 Claims. (Cl. 138—50)

This invention relates to improvements in flexible metallic tube or hose, and more particularly to corrugated tube or hose and involves the use of a plurality of plies. Described more in detail, one form of my invention includes the use of an inner metallic corrugated ply and intermediate tubular metallic braid ply and an outer metallic tube or hose ply, all of the plies being corrugated either with parallel or helical grooves.

A flexible metallic tube or hose constructed according to my invention can be sold in any lengths by the manufacturer or dealer and then can be cut to the required length in the field, or at the work by unskilled labor and without special tools. The construction is such that the fittings or couplings can be attached or detached by unskilled labor and without special tools. Of course the entire unit is of all metal construction throughout. It has the advantage of the safety factor afforded by the tubular metallic braid covering, but in view of the fact that this metallic braid constitutes the intermediate ply it does not interfere with the cutting of the tube or hose to the required length by unskilled labor. Due to its construction this tube or hose has the quality of limited elongation, that is, it can elongate under sudden, accidental stress, or pull, without tearing the braid and causing destruction of the tube or hose. Due to the intermediate ply being composed of metallic braid, this metallic tube or hose will resist the usual internal pressures met in industrial applications without appreciable elongation or distortion. Due to its construction this tube or hose is very strong, has a very long life, and may be bent or coiled into various shapes and forms without danger of breaking or cracking or leakage.

My invention also includes a multi-ply tubular construction having an inner corrugated metallic tube and an outer tubular metallic braid, the plies being corrugated with parallel or helical grooves with the depth of the corrugations in the braid and tube being substantially the same.

To the accomplishment of the foregoing, and such other objects as may hereinafter appear, this invention consists in the construction and combination of parts hereinafter described and sought to be defined in the appended claims, reference being had to the accompanying drawing forming a part hereof, which shows two embodiments of my invention, it being expressly understood, however, that various changes may be made in practice within the scope of the claims without digressing from my inventive idea.

In the drawing:

Fig. 1 represents a combined side elevation and longitudinal cross sectional view of a piece of metallic tube or hose constructed to embody my invention; and Fig. 2 represents another form of my invention in which the depth of the corrugation of the inner corrugated tube is less than the depth of the corrugation of the outer tube.

Referring now to the drawing, the reference character 1 designates the inner ply, the reference character 2 the intermediate ply, and the reference character 3 the outer ply of the plurality of plies making up the complete construction. Additional or fewer plies may be used to advantage according to my invention, but it is to be understood that the three-ply arrangement illustrated is the preferred form, and forms the basis for all the various advantages and desirable features of this invention.

As illustrated in Fig. 1 these plies are corrugated so as to fit one within the other to form a complete strong integral unit. It is obvious that the corrugations may be made in various ways, either parallel or helical, or otherwise. The outside folds 4 of the outer corrugated tube 3 are preferably of uniform size and shape to facilitate application of fittings, couplings, etc. The pitch of the inner tube 1, intermediate braid 2 and outer tube 3 is preferably the same for a single corrugation.

The construction is unusually strong and will resist ordinary or usual internal pressures without appreciable elongation. In case of accidental fracture or breaking of either the inner or the outer metallic tube the metallic braid will hold the tubes together and prevent a complete fracture of the metallic tube or hose as a whole. Under accidental stresses this flexible tube or hose can give lengthwise sufficiently to absorb the stress, because the intermediate metallic braid ply is corrugated like the inner and outer plies and interfits with them and will flatten out slightly to the extent that the tubing elongates to take care of such stress.

Any suitable fittings or couplings may be readily attached to the tube as a whole, and no special reinforcements are necessary at the point of attachment to the fittings. Of course the structure presents great resistance to any detrimental twisting of the metallic tube or hose, and permits the same to be bent or formed into various shapes or coils without danger of fracture and to permanently remain in such bent shape or form.

In some instances it may be advisable to include a sealing compound between the inner and outer metallic tubes and of course this may be readily done, and has obvious advantages. Furthermore, the inner and outer metallic tubes may be formed of strip metal helically wound with the metallic braid interposed between the inner and outer tubes, and the corrugations may be of either open or close pitch design.

Due to the use of the metallic braid to form the intermediate ply the pattern of the mesh of the braid will be impressed upon the inner and outer corrugated metallic tubes, or in other words, the metallic braid will slightly indent the contacting surfaces of the inner and outer metallic tubes. This indenting of the pattern of the mesh of the braid is shown on the surface of the inner corrugated tube at 4' in Fig. 1. This results in a close frictional contact between the metallic braid and the inner and outer tubes, and adds to the strength of the structure as a whole, and also reduces any tendency to elongation when the hose is subjected to internal pressure.

In Fig. 2 another form of my invention is shown in which a multi-ply construction is shown. In this form the depth of the corrugation of the inner tube 5 is less than the depth of the corrugation of the outer tube 6 so that there is a space 7 between the corrugated tubular metallic braid 8 and the outer tube 6. The space 7 is positioned between the outer folds 9 of the outer corrugated tube and the outer folds 10 of the corrugated metallic braid 8. The pitch of the corrugations of the three plies is the same, but the depth of the corrugation of the inner tube is shallower than the depth of the corrugation of the outer tube, and consequently a wedging, self-locking effect between the inner and outer tubes is obtained when the tubes elongate under internal pressure. It is obvious that the outer tube normally should elongate more than the inner tube, but by this arrangement the tendency to elongate is reduced to a minimum. In this form of construction the design or mesh of the corrugated tubular metallic braid 8 is also impressed upon and indented into the surface of the inner corrugated tube 5 as in the other constructions.

My invention also includes a two-ply construction having an inner corrugated metallic tube and an outer corrugated tubular metallic braid, the plies being corrugated either with parallel or helical grooves. In this case the braid design is also impressed on the tube surface.

While I have shown open pitch corrugated tubes in the drawing, that is, tubes having the vertical outside walls of the grooves spaced, I can also use close pitch corrugated tubes in my multi-ply constructions in which the upper portions of the vertical outside walls of the grooves are close together. The open pitch construction is adapted for use where there are vibrations and occasional bending, while the close pitch construction is more flexible and is adapted for use where frequent flexing or bending is needed. The close pitch is preferably used when only two plies including an inner corrugated tube and an outer corrugated tubular metallic braid are used, but is not restricted thereto and can also be used with the other multi-ply constructions. The close pitch assists in holding the braid in position where a two ply construction is desired.

Of course it is to be understood that there may be a number of plies of the flexible corrugated metal tube, and also that there may be a number of plies of the tubular metallic braid and that the flexible metallic tubes may be of seamless, welded, brazed or soldered construction, or may be made of strip material crimped or interlocked and wound helically into tubular shape.

What I claim is:

1. A flexible metallic tubing or hose including, in combination, a plurality of corrugated flexible metallic tubes positioned one within the other and an intermediate tube or ply formed of metallic braid and fitting between two of said flexible corrugated metallic tubes and being similarly corrugated.

2. A flexible metallic tubing or hose including, in combination, an inner flexible corrugated metallic tube, an intermediate tube formed of metallic braid, and an outer flexible corrugated metallic tube, all fitting tightly together so that the intermediate metallic braid fits within the corrugations of the inner and outer flexible metallic corrugated tubes, the metallic braid being pressed into the contacting surfaces of the inner and outer flexible metallic corrugated tubes so as to indent the pattern or mesh of said braid into said surfaces.

3. A flexible metallic tubing or hose including, in combination, a plurality of corrugated flexible metallic tubes positioned one within the other and an intermediate tube or ply formed of metallic braid and fitting between two of said flexible corrugated metallic tubes and being similarly corrugated, the corrugations of the inner tube being less in depth than the corrugations in the outer tube.

4. A flexible metallic tubing or hose including, in combination, an inner flexible corrugated metallic tube, an outer flexible corrugated metallic tube, and an intermediate corrugated tubular metallic braid, the depth of the corrugation of said inner tube being less than the depth of the corrugation of said outer tube, the pattern of the mesh of said corrugated tubular metallic braid being impressed on and indented into the surfaces of said inner and outer flexible corrugated tubes.

FRANZ JACOBSON.